United States Patent [19]

Reynolds et al.

[11] Patent Number: 4,501,451
[45] Date of Patent: Feb. 26, 1985

[54] VEHICLE BRAKING SYSTEM

[75] Inventors: Desmond H. Reynolds; Philip A. Taft, both of West Midlands, England

[73] Assignee: Lucas Industries Limited, Birmingham, England

[21] Appl. No.: 435,932

[22] Filed: Oct. 22, 1982

[30] Foreign Application Priority Data

Nov. 5, 1981 [GB] United Kingdom ............... 8133451

[51] Int. Cl.³ .............................................. B60T 13/10
[52] U.S. Cl. ............................... 303/6 A; 137/624.27; 188/354; 303/56
[58] Field of Search .................. 188/354, 16; 137/624.27; 91/426; 180/6.2, 6.7; 303/56, 6 A

[56] References Cited

U.S. PATENT DOCUMENTS 2,366,696  1/1945  Boldt ................................. 188/354
3,866,880  2/1975  Schexnayder ............. 137/624.27 X

FOREIGN PATENT DOCUMENTS 0880242   6/1953  Fed. Rep. of Germany ........................ 137/624.27
1122388   1/1962  Fed. Rep. of Germany ...... 188/354
0322269  12/1929  United Kingdom ................... 188/16
1035719   7/1966  United Kingdom ................ 188/354

Primary Examiner—Bruce H. Stoner, Jr.
Assistant Examiner—Michael P. Gilday
Attorney, Agent, or Firm—Scrivener, Clarke, Scrivener and Johnson

[57] ABSTRACT

A selector valve for a vehicle braking system in which brakes mounted on opposite sides of the vehicle can be operated selectively either together or independently, comprises an operating lever (9) for displacing a valve spool (2) to control communication between inlet ports (3,4) and outlet ports (5,6), the lever being guided by a slot (8) which includes latching notches (20) in which the lever is engageable to preselect a particular steering mode of brake operation. The lever is automatically disengaged from the notches after each brake operation by a piston (15) which is actuated by the fluid pressure in a chamber (16) connected to an inlet port (4).

8 Claims, 4 Drawing Figures

VEHICLE BRAKING SYSTEM

This invention relates to a selector valve for a vehicle braking system of the kind in which brakes mounted on opposite sides of the vehicle are selectively operable either together for normal straight line braking, or independently to assist vehicle steering. Braking systems of this kind are commonly employed on agricultural tractors and similar vehicles.

In a known braking system communication between a pedal actuated pressure source and the brakes is controlled by a manually operated control or selector valve which comprises a body with inlet means for connection to the pressure source and a pair of outlets for connection to the respective brakes, a valve member movable in the body to control communication between the inlet means and said outlets, and an operating member movably mounted to the body and coupled to the valve member for displacing the valve member, the operating member being biased to a central position in which both outlets are operatively coupled to the inlet means, and the operating member being movable against the bias to opposed end positions in which a respective outlet is connected operatively to the inlet means. A disadvantage of the known system is that the vehicle driver is required to operate the selector valve as the brake pedal is depressed, e.g. when wishing to execute a spin turn, which is often inconvenient since it is exactly at this time that the driver may be required to perform other manual functions, such as lifting a plough.

The present invention seeks to avoid this drawback and provides a selector valve characterised in that latch means is arranged to retain the operating member releasably in a selected end position.

The improved selector valve of the invention allows a particular steering mode to be pre-selected so that it is achieved automatically when the brakes are next operated.

Conveniently the latch means may be constituted by notches at the end of a slot which guides movement of a pivoted operating lever, and a spring which biases the lever to the central position may also serve to hold it in the notches.

As a safety factor it is considered important that it should not be possible for the selector valve to be inadvertently left in a steering mode for which reason it is a preferred feature of the invention that means is provided for disengaging the latch means and returning the operating member to the central position so that the pre-selected steering mode is cancelled automatically when the brakes are operated. The disengaging means can be actuated in response to an increase in pressure at the inlet means and for this purpose may comprise a chamber having a movable wall member and connected to the inlet means, a member connected to the movable wall member being adapted to press against the operating member and disengage it from the latch means.

A clear understanding of the invention will be had from the following description which is given with reference to the drawings in which.

Figure 1:
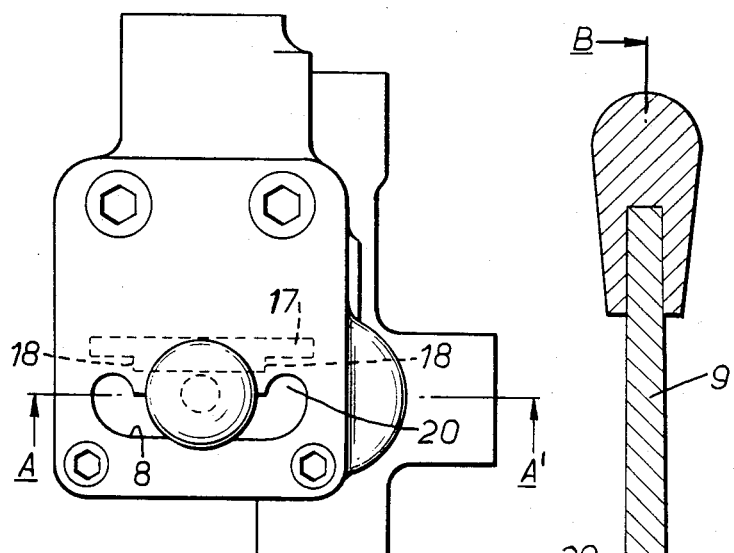
FIG. 1 is a top plan view of a selector valve.
Figure 2:
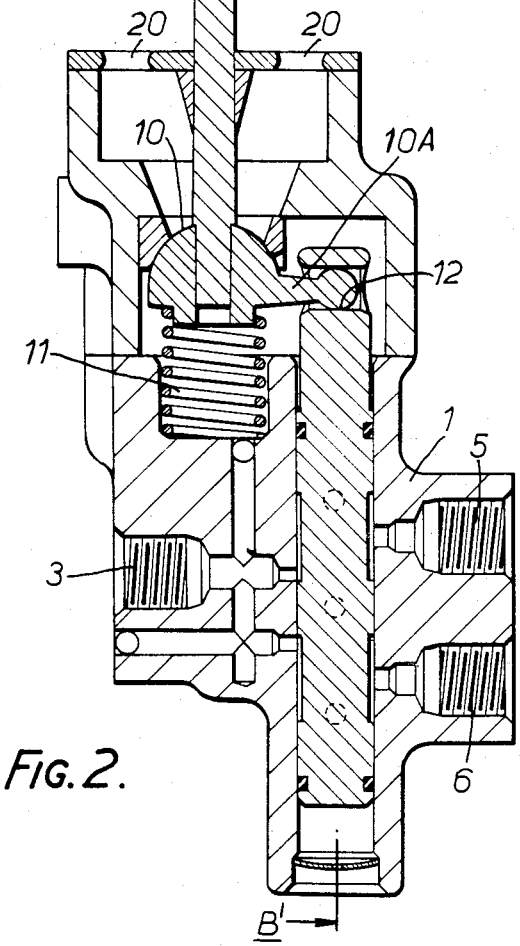
FIG. 2 is a section taken along the line AA' in FIG. 1.
Figure 3:
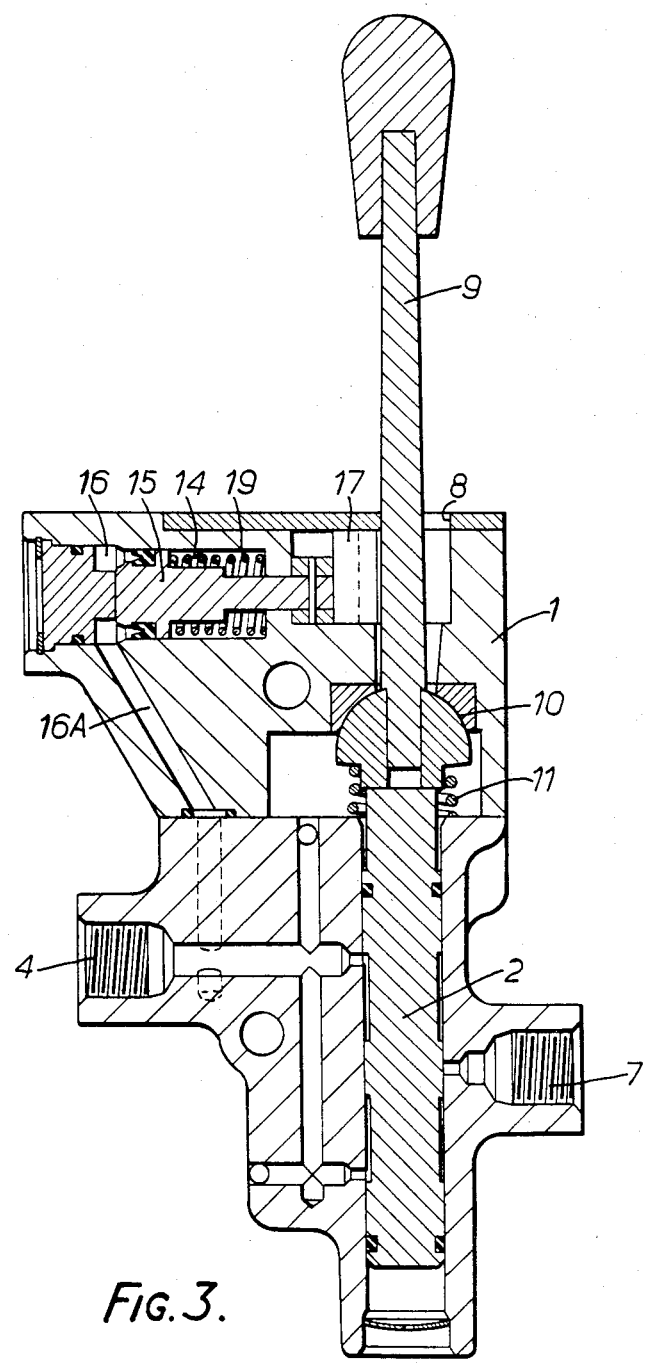
FIG. 3 is a section taken along the line BB' in FIG. 2.

The selector valve illustrated in FIGS. 1 to 3 has a body 1 including a bore receiving a slidable valve spool 2 which controls communication between inlet ports 3, 4, outlet ports 5, 6 for connection to brakes at respective sides of the vehicle, and a port 7 connected to reservoir.

Projecting through the top wall of the body through an E-shaped slot 8 is a control lever 9, the lower end of which is journalled to the valve body by a half-spherical ball joint 10. A spring 11 acts between the lever 9 and the body 1, and in conjunction with the joint 10 biases the lever into a central upright position, as shown, in which it passes out via the central side limb of the E slot. The lever 9 has a lateral finger 10A with an integral ball at the end engaged in a transverse hole 12 formed in the upper end of the valve spool 2. From the foregoing description it will be understood that backwards and forwards displacement of the control knob, in the direction to move the lever 9 into and out of the locking notches defined by the side limbs of the E slot does not cause any displacement of the valve spool, and the lever is biased to engage in one of these notches by spring 11.

As may be seen in FIG. 3, the valve body includes a further bore 14 in which a piston 15 is accommodated. The piston is displaceable in the bore in the direction towards the control lever 9 under the pressure in a chamber 16 which communicates with the inlet port 4 via a passageway 16A. The piston projects through the inner end wall of bore 14 and carries a latch plate 17 of generally T-shaped cross-section (see FIG. 1) defining laterally opposed shoulders 18. When the piston is driven forwards against its return spring 19 by pressure in chamber 16, the plate 17 engages the lever 9 to push it out of whatever latching notch it happens to be engaged in. If the lever is engaged in one of the end notches 20 the adjacent shoulder 18 on plate 17 prevents the lever being returned to the central position under the bias of spring 11 until the pressure in chamber 16 has diminished and the piston 15 has been moved back under the force of spring 19 to retract the latch plate 17.

If the next braking mode required is normal in line braking, the control lever is left in the central upright position shown, the valve spool 2 then being positioned to connect the two inlet ports 3, 4 to the two outlet ports 5, 6 so that when the brake pedal is depressed equal pressure is delivered to the brakes on both sides of the vehicle. The pressure is also supplied to chamber 16 causing plate 17 to move lever 9 out of the central latch notch, to which it returns when the brakes are released.

If the next required braking mode is for steering, e.g. to apply the right hand brakes only, the lever 9 is manipulated to engage the right hand end latch notch 20. This adjustment of the lever causes a downward displacement of spool 2 to bring the inlet port 4 into communication with the outlet port 6 leading to the right hand brake while the other inlet port 3 and the outlet port 5 leading to the left hand brake are both connected to reservoir by port 7. The selector valve remains stable in this condition until the brake is operated, when the pressure fluid is supplied to the right hand brake and to chamber 16 so that latch plate 17 disengages the lever 9 from the latch notch 20. However, the shoulder 18 prevents the lever returning to the central neutral position under the bias of spring 11 until the brake is released and the pressure in chamber 16 falls.

Operation of the valve for left hand brake operation only is essentially the same, but the lever 9 is then moved to the left and the spool is displaced upwardly to obtain the required fluid connections. The automatic cancellation of the pre-selection is exactly the same as described above.

It should be noted that the pre-selection of the steering mode can be cancelled manually before the brakes are operated simply by returning the lever 9 to its central position.

Figure 4:
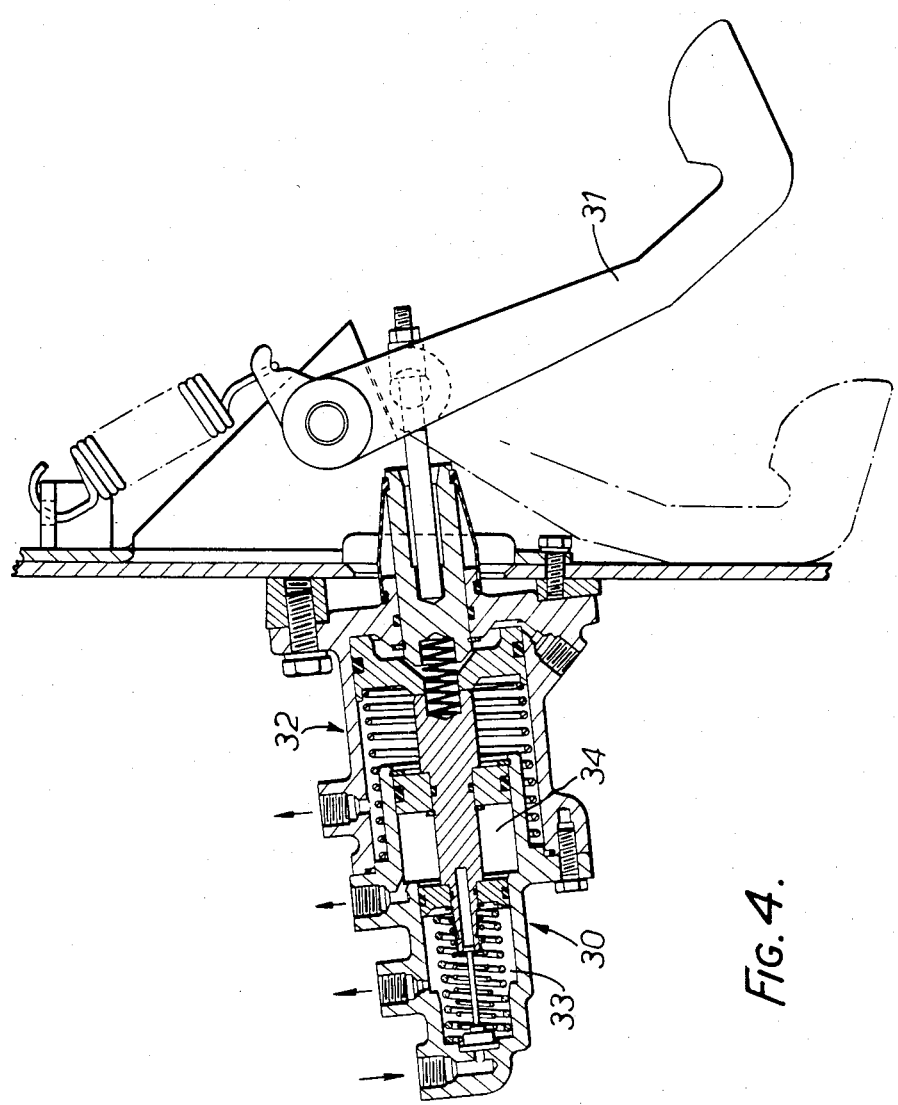
FIG. 4 is a cross-section through an actuating assembly for use with the selector valve.

The actuating mechanism shown in FIG. 4 consists of a tandem master cylinder 30 which is actuated by a pedal 31 through a booster 32, the two chambers 33, 34 being connected to the inlet ports 3, 4 of the selector valve, respectively. For straight ahead braking the fluid from both chamber 33, 34 is supplied to the brakes, but when the brake at one side of the vehicle only is operated only chamber 34 is operative, the other chamber 33 being connected to reservoir by the selector valve. This arrangement ensures an increased pressure for steering braking, for a given input effort, and the ratio of the effective areas of the master cylinder pistons can be chosen according to the increase required.

The selector valve illustrated in the drawings could be easily modified to control also trailer brakes so that those brakes will only be applied when the main vehicle brakes are operated for normal in line braking.

We claim:

1. A selector valve comprising a body with inlet means for connection to a fluid source and a pair of outlets for connection to respective brakes, a valve member movable in the body to control communication between the inlet means and said outlets, an operating lever pivoted to the body and coupled to the valve member for displacing the valve member, the operating lever having a central position in which both outlets are operatively connected to the inlet means and the operating lever being movable from said central position to opposed end postions in which a respective outlet is connected operatively to the inlet means, a linear guide slot in the body for guiding the lever to move in a plane between said end positions, and latching notches in a side edge of the slot adjacent the opposite ends of the slot, the lever being engageable in the notches to retain the lever releasably in a selected end position, and the lever being coupled to said valve member by an element extending laterally from the lever in said plane of movement and connected to the valve member by a universal joint, whereby movement of the lever laterally of the slot to engage and disengage the notches does not cause displacement of the valve member.

2. A selector valve according to claim 1, wherein the lever is pivoted to the body by a ball and socket type joint, spring means acts on the lever for urging the lever into said central position, and said spring means is arranged to retain the lever in said notches after engagement therewith.

3. A selector valve according to claim 1, wherein means is provided for disengaging automatically the lever from the latching notches and returning the operating lever to the central position after one of the brakes has been actuated with the operating lever in one of said end positions.

4. A selector valve according to claim 3, wherein said disengaging means is actuated in response to an increase in pressure at said inlet means.

5. A selector valve according to claim 4, wherein the valve member is located in a first chamber and said disengaging means comprises a second chamber in said body, said second chamber having a movable wall member and communicating with said inlet means, said wall member being displaceable by fluid pressure in said second chamber to disengage said lever from the latching notches.

6. A selector valve according to claim 5, wherein said wall member is connected to a member adapted to press against the operating lever to disengage the operating member from said latching notches.

7. A selector valve according to claim 6, wherein said pressing member comprises abutment surfaces for engagement by said operating lever to prevent the operating lever returning to the central position until the pressure in the second chamber is reduced and the pressing member is retracted to release the operating lever.

8. A selector valve according to claim 5, wherein the inlet means comprises first and second ports for connection to respective fluid sources, the body includes a reservoir port for connection to a fluid reservoir, and the valve member is so arranged that the inlet ports communicate with the outlets and the reservoir port is closed in said central position of the operating lever, and when the operating lever is in an end position a respective outlet communicates with the said first inlet port and the other outlet and said second inlet port communicate with said reservoir port, and said second chamber is connected to said first inlet port.

* * * * *